UNITED STATES PATENT OFFICE.

RICHARD B. EARLE, OF BOSTON, MASSACHUSETTS, ASSIGNOR TO HOOD RUBBER COMPANY, OF BOSTON, MASSACHUSETTS, A CORPORATION.

PROCESS OF PREPARING ISOPRENE.

1,050,354. Specification of Letters Patent. Patented Jan. 14, 1913.

No Drawing. Application filed November 12, 1910, Serial No. 592,101. Renewed May 16, 1912. Serial No. 697,785.

*To all whom it may concern:*

Be it known that I, RICHARD B. EARLE, citizen of the United States, residing at Boston, Massachusetts, have invented certain new and useful Improvements in Processes of Preparing Isoprene, of which the following is a specification.

The object of the present invention is to provide an improved economical and efficient method of preparing isoprene, and the invention includes the method hereinafter described and particularly defined by the appended claims.

Isoprene is an unsaturated hydrocarbon having the formula $C_5H_8$. It has heretofore not been a useful substance on account of the high cost of production and has been best produced by the distillation of turpentine through red hot tubes.

The present process consists in a dry distillation of palmitate of dimethyl-ethylene-carbinol and the preparation of the same. This ester has the following formula:

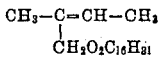

This substance is prepared by heating together sodium palmitate with the chlor-trimethylethylene of the following formula:

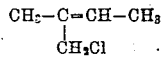

preferably in alcoholic solution in a closed vessel to temperatures of over 150° C.

The following example shows the method I prefer to use in the preparation of isoprene: Chlor-trimethylethylene and dry sodium palmitate in proportions of one molecule of each are mixed with an equal weight of alcohol and heated in a closed vessel for several hours to a temperature of approximately 180° C. The liquid is then, after cooling, filtered off from the separated sodium chlorid and the alcohol distilled off, leaving the palmitate of dimethyl-ethylene-carbinol which is pure enough for my purpose. This substance is then directly distilled in any suitable vessel by any suitable source of heat, and during the process of distillation breaks down into isoprene and palmitic acid, the former of which can be separately collected in suitable receivers. During this distillation it is desirable to pass a current of dry carbon dioxid through the apparatus.

The efficiency of the hereindescribed process is about 60%.

Having described the invention I claim as new:

1. A step in the method of producing isoprene which consists in dry distilling dimethyl-ethylene-carbinol-palmitic ester.

2. The herein described method of producing isoprene which consists in first heating together chlor-trimethylethylene with sodium palmitate and alcohol to produce dimethyl-ethylene-carbinol palmitic ester, and then dry distilling said product.

3. The herein described method of preparing isoprene which consists in mixing together chlor-trimethylethylene and sodium palmitate and alcohol, heating the same in a closed vessel, cooling and filtering the same and distilling off the alcohol, dry distilling the residue, and collecting the isoprene produced thereby.

4. The herein described method of preparing isoprene which consists in mixing together chlor-trimethylethylene and sodium palmitate and alcohol, heating the same in a closed vessel, cooling and filtering the same and distilling off the alcohol, dry distilling the residue in the presence of a current of inert gas, and collecting the isoprene produced thereby.

5. As a step in the manufacture of isoprene, the preparation of dimethyl-ethylene-carbinol palmitic ester by heating together chlor-trimethylethylene with sodium palmitate and alcohol in a closed vessel.

In testimony whereof, I affix my signature in presence of two witnesses.

RICHARD B. EARLE.

Witnesses:
JAMES M. SPEAR,
WILLIAM W. DUNCAN.